Aug. 26, 1969  G. W. VAN KOL  3,464,035
FILTER COUPLED TO MICROWAVE GUIDE

Filed July 25, 1966  3 Sheets-Sheet 1

INVENTOR.
GERALD W. VAN KOL
BY
Allen and Heromy
ATTORNEYS

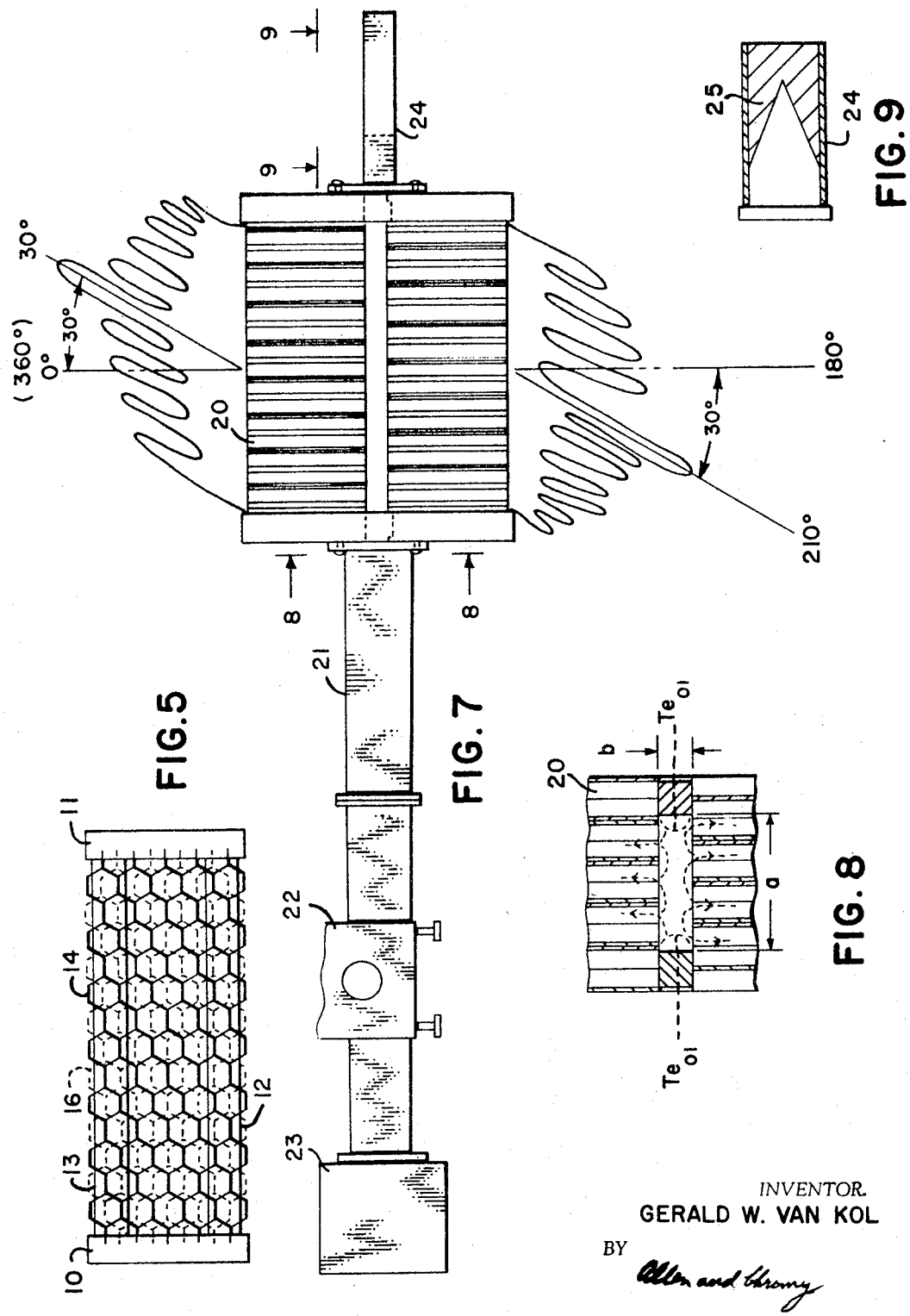

United States Patent Office 3,464,035
Patented Aug. 26, 1969

3,464,035
FILTER COUPLED TO MICROWAVE GUIDE
Gerald W. Van Kol, 10651 Santa Lucia Road,
Monta Vista, Calif. 95014
Filed July 25, 1966, Ser. No. 567,501
Int. Cl. H01p 1/22, 5/14
U.S. Cl. 333—73                                    3 Claims

ABSTRACT OF THE DISCLOSURE

A broad band harmonic absorption microwave filter adapted for use with high power microwave guides of the $TE_{10}$ mode. This wave guide employs a pair of honeycomb cellular structures which are arranged to form the opposite broad walls of the wave guide. Each cellular structure employs a plurality of tubular cells honeycombed together and each tubular cell has a diameter approximately equal to the width of the narrow wall of the guide. These tubular cells are arranged so that a sufficient number thereof couple to the narrow wall $TM_{11}$, $TE_{01}$, and $TE_{11}$ modes and harmonics for the efficient absorption thereof. The continuity of the narrow walls does not have to be disturbed or cut with holes, slots, etc.

---

This invention relates to harmonic absorption filters for use in microwave guides.

An object of this invention is to provide an improved harmonic absorption filter for use in microwave guides.

Another object of this invention is to provide an improved harmonic absorption filter that is economical, light-weight and of compact construction.

Another object of this invention is to provide an harmonic absorption filter that has broad band harmonic absorption characteristics and is adapted to be used in wave guides of high power capacity.

Still another object of this invention is to provide an improved harmonic absorption filter of economical design that may be used to absorb all higher modes and harmonics generated at the fundamental mode source such as the klystron, magnetron or traveling wave tube microwave generator.

Still another object of this invention is to provide an harmonic absorption filter for wave guides, said filter being constructed by providing a cellular structure to each opposing slotted side of the wave guide, said cellular structure having individual cells dimensioned so as to provide a desired predetermined cutoff wave length to the filter.

Still another object of this invention is to provide an improved harmonic absorption filter which is adapted to be connected to a wave guide operating at full wave guide range of the $TE_{10}$ mode, said filter having slotted sides in which the slots extend over substantially the width of the widest dimension to which open ends of cellular structures are connected for receiving the harmonics that are to be absorbed.

Still another object of this invention is to provide an improved harmonic absorption filter for use in the X microwave band operating at full range of the $TE_{10}$ mode, said filter being provided with cellular structures coupled to opposite sides thereof such that a single cell size may be used for two wave guide frequency ranges of 8 to 10 kilomegahertz and 8.2 to 12.4 kilomegahertz.

Still another object of this invention is to provide an improved harmonic absorption filter of economical design having an intermediate impedance transformer incorporated therein such that the resulting structure provides a substantially smooth and low voltage standing wave ratio (VSWR) characteristic curve between 8.5 and 9.5 kilomegahertz in which the voltage standing wave ratio (VSWR) is less than 1.02 to 1.

Still another object of this invention is to provide an harmonic absorption filter adapted for use in high power systems which does not employ reflecting rods, septa or mode conversion transitions to boost absorption level for harmonics and undesired modes.

Still another object of this invention is to provide a bi-directional microwave antenna using open cellular structures coupled to opposite sides of a slotted wave guide for radiating microwave signal energy from the open sides of the cellular structures.

Other and further objects of this invention will be apparent to those skilled in the art to which it relates from the following specification, claims and drawing, in which, briefly:

FIG. 5 is a plan view of the filter without the harmonic absorption material in the hexagonal cells to show the positions of the bottom cells, which are shown in broken lines, with respect to the top cells;

FIG. 7 is a side view of a bi-directional microwave antenna arrangement employing unloaded cellular structures on opposite sides thereof;

FIG. 8 is a sectional view taken along the line 8—8 of FIG. 7 showing the distribution of the $TE_{01}$ mode therein; and FIG. 9 is a sectional view taken along the line 9—9 of FIG. 7 showing the wave guide termination.

Figure 1:
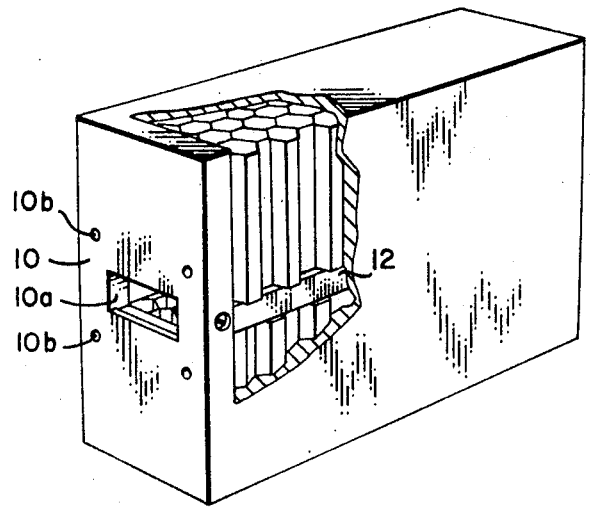
FIG. 1 is a perspective view of an embodiment of this harmonic absorption filter partially in section, said filter being encased in a potting material on all sides except the front and back.

Referring to the drawing in detail, reference numerals 10 and 11 designate the metal end members of the filter which are adapted to be attached to a conventional wave guide. These end members are provided with rectangular holes 10a and 11a, respectively, to which the channels of the wave guides with which this filter is to be used, are coupled. Threaded holes are provided to the end members 10 and 11, such as the holes 10b shown in FIG. 1 in the end member 10, and are also provided around the rectangular holes 10a and 11a so that wave guides may be attached to the filter by suitable threaded screws. The holes 10a and 11a form the openings to the wave guide channel 15. The broad wall dimension of this channel is designated by the letter $a$ and the narrow wall is designated by the letter $b$.

Two side rails 12 and 13 are provided between the end members 10 and 11 and these rails define the sides of the microwave channel 15 through the filter. The thickness of these rails forms the $b$ dimension of the channel 15. Suitable notches are provided in the members 10 and 11 for receiving the end parts of the side rails 12 and 13 which are attached to the end members by soldering, brazing or the like, and in addition, machine screws such as the screws 10b and 11b, shown in FIG. 2, may be used for holding the side rails assembled with the end members prior to and during soldering or brazing thereof.

The inside walls of the end members 10 and 11 are provided with two sets of shallow slots 10c–10d and 11c–11d as shown in FIGS. 3, 4, 5 and 6. The shallow slots 10c are displaced laterally with respect to the shallow slots 10d. The upper sets of slots 10c and 11c are adapted to receive the end webs 14a and 14b, respectively, of the cellular structure 14 which comprises a plurality of substantially hexagonally shaped cells having the open ends thereof positioned in a plane that is flush with the upper broad side of the microwave channel 15.

Another cellular structure 16 is attached to the end members 10 and 11 by inserting the end web portions 16a and 16b thereof into the shallow slots 10d and 11d, respectively. The open ends of the cellular structure 16 are positioned in a plane defining the other broad side of the microwave channel 15. The end web portions 14a and 14b of cellular structure 14 may be attached to the shallow grooves 10c and 11c, respectively, by soldering, brazing or the like, and the ends of the side cells of this cellular structure engaging the side rails 12 and 13 may also be attached thereto by soldering, brazing or the like. The end webs 16a and 16b of the other cellular structure 16 may also be attached to the grooves 10d and 11d of the end members by soldering, brazing or the like, and the side cells of this cellular structure may be likewise attached to the side rails 12 and 13. The cellular structure 14 may be made in various ways such as molding or casting, or it may be made by using a plurality of sheets of sheet metal shaped to have hexagonal cells formed therebetween which have the overlying parts thereof joined together by spot welding or the like.

The six-sided hexagonal or honeycomb cellular structure provides all cells thereof of the same size, and each having six sides of substantially the same length, as shown in FIG. 5. In constructing a filter for use in an H band (7.050–10.0 G hertz) wave guide, operating at a frequency of two-thirds of the wave guide range, and also for use in an X band filter operating at the full wave guide range of the $TE_{10}$ mode, the cellular structure was selected with cells each having a diameter of 0.375 inch between opposing parallel sides. The overall dimensions of each cellular structure selected was 5" long by 2" wide by 2" thick. The above cell size provides a cellular structure that may be used for the wave guide ranges of 8–10 kilomegahertz and 8.2–12.4 kilomegahertz using the lowest order of mode propagation in the wave guide, that is, the $TE_{10}$ mode, and providing the channel 15 with an $a$ dimension of 1.122 inches in air dielectric. The cutoff frequency of 5.26 kilomegahertz was obtained using hexagonal cellular structures with cell dimension between opposing flat parallel sides of 0.375".

Figure 2:
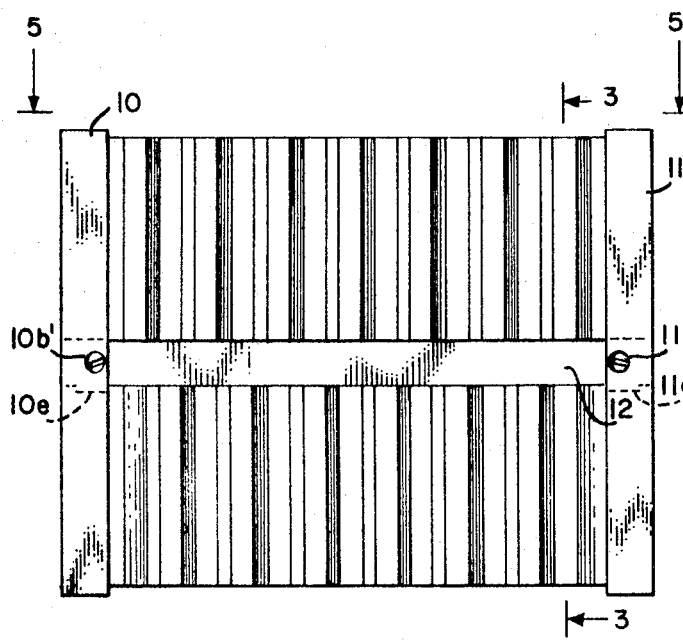
FIG. 2 is a side view of an embodiment of this harmonic absorption filter.
Figure 4:
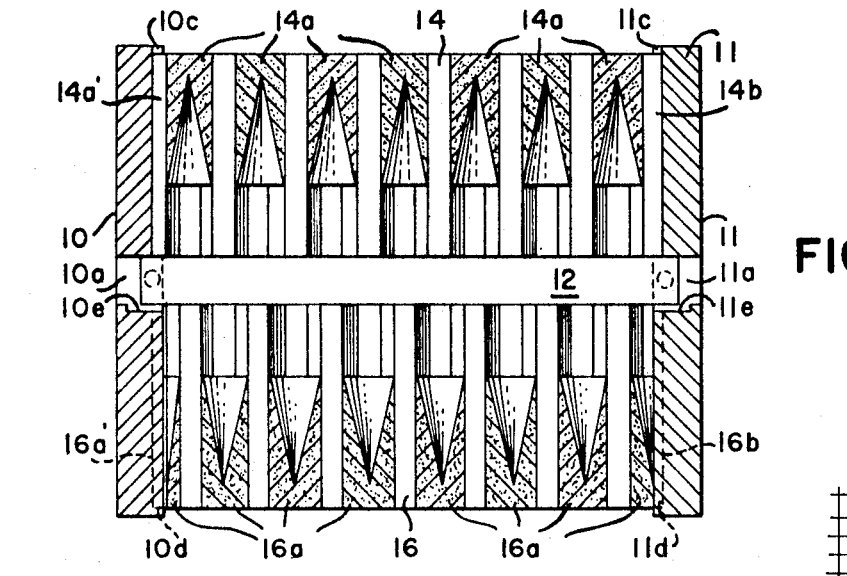
FIG. 4 is a sectional view taken along the line 4—4 of FIG. 3.
Figure 6:
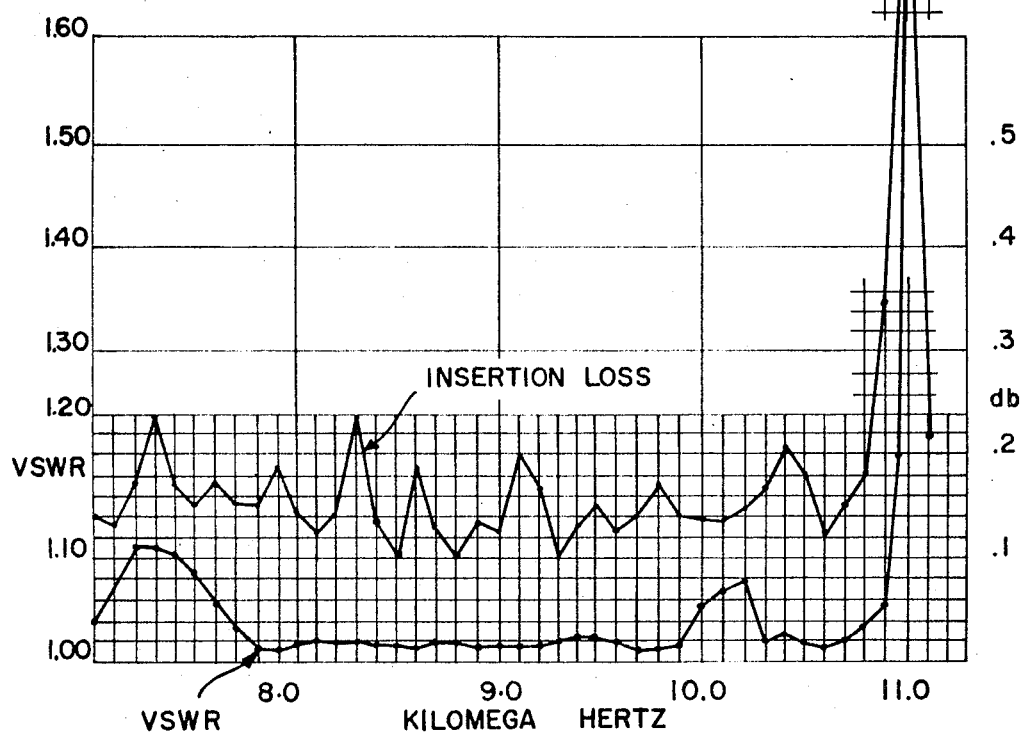
FIG. 6 illustrates an insertion loss curve and a voltage standing wave ratio curve obtained using a filter of this invention coupled to a microwave guide operating in the H band.

End members 10 and 11 were provided with intermediate impedance transformers which consist of steps 10e and 11e, respectively, as shown in FIGS. 2 and 4. These steps each extend across the bottom broad wall $a$ of the channel 15 and each step is 0.40" long by 0.025" deep milled into the back side of each of the end members. These impedance transformers provide a lower and smoother voltage standing wave ratio characteristic curve between 8.5 and 9.5 kilomegahertz,a as illustrated by curve designated VSWR shown in FIG. 6. The voltage standing wave ratio in this portion of the curve is less than 1.02 to 1, or less than 0.010 percent reflection of power in the fundamental mode. The upper curve in FIG. 6 represents the insertion loss for the fundamental mode caused by this filter. This loss between 8.5 and 9.5 kilomegahertz was less than 0.20 db. Thus, the power lost by filter structure absorption was less than 4.5 percent.

Figure 3:
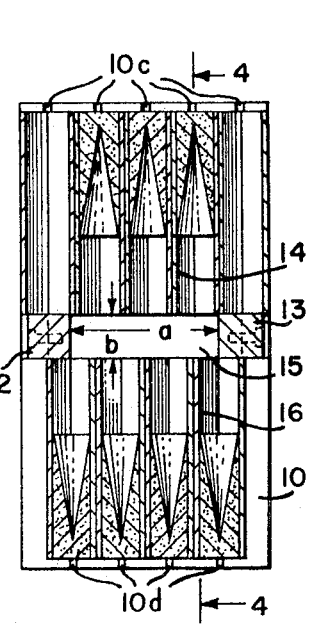
FIG. 3 is a sectional view taken along the line 3—3 of FIG. 2.

The curves shown in FIG. 6 were obtained from filters prior to the loading thereof with harmonic termination material comprising the plugs 14a and 16a inserted into the cells of cellular structures 14 and 16, respectively, as shown in FIGS. 3 and 4. The material for these plugs was obtained by mixing substantially equal parts of powdered aluminum with powdered silicon carbide and cementing these ingredients together and to the inside walls of the cells of the cellular structure with 20 percent epoxy resin. This mixture was poured into the open cells on the tops of pointed plugs which were inserted into the cells so that the harmonic termination material 14a and 16a was provided with conical cavities open into the cells, as shown in FIG. 4. The mixture was allowed to cure and the plastic plugs were then removed. The cellular structures 14 and 16 were then assembled with the frame, including the end members 10 and 11 and the rails 12 and 13, as previously described. The conical cavities in the harmonic termination material face inward toward channel 15 in the assembled structure.

Second harmonic absorption level measurements of the filter with harmonic terminations 14a and 16a showed that between 17.0 kilomegahertz and 18.5 kilomegahertz the absorption of the filter was greater than 40 db or 99.99 percent of the harmonic power in the $TE_{10}$, $TE_{20}$, $TM_{11}$, $TE_{11}$ second harmonic modes. The absorption of the narrow wall $TE_{01}$ mode in the second harmonic range was even greater, being on the order of 50 db from 17.0 kilomegahertz to 18.5 kilomegahertz. This wave guide will also couple other narrow wall modes such as $TM_{11}$, $TE_{11}$, etc. and absorb these modes without building the cellular structure into the narrow walls. Also, the use of the cellular structures 14 and 16 of this invention does not require coupling secondary wave guides or circular conducting pipes inside the narrow walls of the wave guide.

As previously described, the cells of the cellular structure are six-sided and, because these cells are honeycombed, alternate cells engaging the rails 12 and 13 couple half port and full port to the channel 15, as shown in FIGS. 3, 4 and 5. Thus, the same cells that couple to broad wall higher order modes and harmonics also couple extremely well to narrow wall modes. As a result, this filter will absorb these narrow wall modes without necessitating the slotting of the narow walls or using resistive material to terminate such modes on these walls. Also, the present invention does not reflect these modes back to the generator where the possibility of arcing or other troubles may result from such reflection.

Harmonic voltage standing wave ratio measurements made on both the broad wall $a$ and narrow wall $b$ showed this ratio to be less than 2 to 1, or less than 10 percent reflection of harmonic power in filters employing the harmonic termination material.

The cell structures 14 and 16 may be made of hexagonal cells that are compress hexagons such that the thickness of each hexagon is less than the width whereby the cells will couple to much higher harmonics on the narrow dimension and also the wider dimension couples to lower harmonics.

The cellular wave guide structure of this invention may also be employed as an antenna when it is connected, as shown in FIG. 7. The cellular structure 20, which is constructed as previously described, and which is not provided with any harmonic termination filter material in the cells thereof, is coupled to the wave guide 21 with the broad wall thereof across the channel through the structure 20 parallel to the narrow wall of the latter so that the $TE_{01}$ mode is excited on the narrow wall $b$ of the cellular structure, as shown in FIG. 8. The wave guide 21 is coupled to the phase shifter 22 which may be manually driven if desired. An oscillator or generator 23 for generating signals in the K or KU band is coupled to the input of the phase shifter 22. Thus, the generator 23 supplies signals in the K or KU band through phase shifter 22 and wave guide 21 to launch the $TE_{01}$ mode on the narrow walls so that the cellular structure 20 is caused to radiate from both the top and bottom thereof. The normal axis of the wave front radiated from the top and bottom of the cellular structure would be directly vertical through this structure. However, a slewed wave front may be obtained as shown by providing a suitable phase shift through use of the shifter 22. Also, the remote end of the cellular structure 20 is provided with a terminating member in the form of a $TE_{01}$ mode wave guide with a recessed resistive member 25 positioned therein, as shown in FIG. 9.

While I have shown a preferred embodiment of the invention, it will be understood that the invention is capable of variation and modification from the form shown

What I claim is:

1. In a broadband harmonic absorption filter adapted to be attached to a microwave guide and being capable of conducting a microwave guide mode of the lowest order, that is, the $TE_{10}$ mode and absorbing all higher modes and harmonics at least through the fourth harmonic, the combination of a pair of spaced end members of electrically conducting material, a pair of rails connected to said end members and extending therebetween, said rails forming the opposed narrow walls of a wave guide channel, said end members having holes therethrough opening to said channel, said end members having means for attaching thereof to a wave guide aligned with said holes, a pair of honeycomb cellular structures positioned between said end members and attached thereto and to said rails, said honeycomb cellular structures having a plurality of tubular cells of substantially uniform dimensions with open end thereof corresponding to the opposed broad walls of said wave guide channel, said open ends of said tubular cells facing each other across said wave guide channel, said tubular cells each having a diameter approximately the width of said narrow wall, said tubular cells being arranged on said broad walls so that they couple to the narrow wall $TM_{11}$, $TE_{01}$, and $TE_{11}$ modes and harmonics thereof, and means in said tubular cells for absorbing said narrow wall modes and harmonics thereof and harmonics of the $TE_{10}$ mode transmitted through said channel.

2. In a broadband harmonic absorption filter adapted to be attached to a microwave guide and being capable of conducting a microwave guide mode of the lowest order, that is, the $TE_{10}$ mode, and absorbing all higher modes and harmonics at least through the fourth harmonic, the combination as set forth in claim 1 further characterized in that said rails form the narrow walls of the wave guide channel, and predetermined ones of said cells engaging said rails being only partially open to said channel so that these cells couple to microwave modes from said narrow walls.

3. In a broadband harmonic absorption filter adapted to be attached to a microwave guide and being capable of conducting a microwave guide mode of the lowest order, that is, the $TE_{10}$ mode, and absorbing all higher modes and harmonics at least through the fourth harmonic, the combination as set forth in claim 1 further characterized in that said end members include impedance transformers comprising shallow steps cut out of the back walls thereof in the holes therethrough.

References Cited
UNITED STATES PATENTS

| | | | |
|---|---|---|---|
| 2,961,619 | 11/1960 | Breese | 333—10 |
| 2,866,595 | 12/1958 | Marie | 333—10 |
| 3,187,277 | 6/1965 | Wantuch. | |
| 3,237,134 | 2/1966 | Price. | |
| 3,353,123 | 11/1967 | Met. | |

HERMAN KARL SAALBACH, Primary Examiner

C. BARAFF, Assistant Examiner

U.S. Cl. X.R.

333—10, 81